US009017086B2

(12) United States Patent
Hu et al.

(10) Patent No.: US 9,017,086 B2
(45) Date of Patent: Apr. 28, 2015

(54) DETACHABLE ELECTRONIC APPARATUS

(71) Applicants: Shun-Chieh Hu, Taipei (TW); Hsin-Chien Chu, Taipei (TW)

(72) Inventors: Shun-Chieh Hu, Taipei (TW); Hsin-Chien Chu, Taipei (TW)

(73) Assignee: Compal Electronics, Inc., Taipei (TW)

( * ) Notice: Subject to any disclaimer, the term of this patent is extended or adjusted under 35 U.S.C. 154(b) by 127 days.

(21) Appl. No.: 13/853,055

(22) Filed: Mar. 29, 2013

(65) Prior Publication Data

US 2014/0213084 A1 Jul. 31, 2014

(30) Foreign Application Priority Data

Jan. 31, 2013 (TW) .............................. 102103816 A

(51) Int. Cl.
*H01R 13/62* (2006.01)
*H04M 1/00* (2006.01)
*G06F 1/16* (2006.01)

(52) U.S. Cl.
CPC .............. *H04M 1/00* (2013.01); *G06F 1/1632* (2013.01); *G06F 1/1656* (2013.01); *G06F 1/1698* (2013.01)

(58) Field of Classification Search
CPC ... H01R 13/6275; H01R 13/627; H04M 1/00; G06F 1/1656; G06F 1/1698; G06F 1/1632
USPC .......................................... 439/159, 160, 157
See application file for complete search history.

(56) References Cited

U.S. PATENT DOCUMENTS 5,933,321 A 8/1999 Ruch et al.
8,747,163 B2 * 6/2014 Little et al. .................... 439/630

FOREIGN PATENT DOCUMENTS

TW I322370 3/2010

* cited by examiner

*Primary Examiner* — Javaid Nasri
(74) *Attorney, Agent, or Firm* — Jianq Chyun IP Office

(57) ABSTRACT

An electronic apparatus including a main body, a base, an electronic device and a control button is provided. The base is detachably disposed in the main body. The electronic device is detachably disposed on the base. The control button is movably disposed on the main body. When the control button moves relative to the main body along a first direction, the control button drives the electronic device to move away from the base and the main body. When the control button moves relative to the main body along a second direction, the control button drives the base to move such that the base and the electronic device move away from the main body.

13 Claims, 6 Drawing Sheets

DETACHABLE ELECTRONIC APPARATUS

CROSS-REFERENCE TO RELATED APPLICATION

This application claims the priority benefit of Taiwan application serial no. 102103816, filed on Jan. 31, 2013. The entirety of the above-mentioned patent application is hereby incorporated by reference herein and made a part of this specification.

BACKGROUND OF THE INVENTION

1. Field of the Invention

The present invention relates to an electronic apparatus, and more particularly, to an electronic apparatus with an electronic device connected thereto.

2. Description of Related Art

With advancement of communication technology, electronic devices such as mobile phones have become indispensible in our daily life. Taking a smart phone as an example, it is not only equipped with various functions of the conventional communication devices, but it also allow users to draft documents, receive and send emails, browse the internet or use instant messaging software through an embedded operation system. That is, such a handheld communication device can not only be used to make calls, but it also can provide various functions like a mini personal computer does. With the advancement of wireless network technology, these functions are no longer limited by time and space.

When the user is to connect the electronic device such as the smart phone to a notebook computer for data transmission or charging, a transmission cable can be used to connect the electronic device with the notebook computer. However, if the electronic device is connected to the notebook computer only through the transmission cable, the user cannot conveniently move the electronic devices and the notebook computer at the same time, and the electronic device may easily fall down to the ground thus damaging the electronic device.

SUMMARY OF THE INVENTION

Accordingly, the present invention is directed to an electronic apparatus which allows an electronic device to be disposed in a main body of the electronic apparatus for data transmission or charging.

The present invention provides an electronic apparatus includes a main body, a base, an electronic device, and a control button. The base is detachably disposed within the main body. The electronic device is detachably disposed on the base. The control button is movably disposed on the main body. When the control button moves relative to the main body along a first direction, the control button drives the electronic device to move away from the base and the main body. When the control button moves relative to the main body along a second direction, the control button drives the base such that the base and the electronic device move away from the main body.

In one embodiment, the first direction is perpendicular to the second direction.

In one embodiment, the electronic apparatus further includes a first sliding member and a second sliding member. The first sliding member is slidably disposed on the main body along the first direction. When the control button moves relative to the main body along the first direction to push the first sliding member, the first sliding member drives the electronic device to move away from the base along the first direction. The second sliding member is slidably disposed on the main body along the second direction. When the control button moves relative to the main body along the second direction to push the second sliding member, the second sliding member pushes the base to move away from the main body along the first direction.

In one embodiment, the base comprises an inclined plane, and the second sliding member is configured to move along the second direction to push the inclined plane so as to drive the base to move along the first direction.

In one embodiment, the electronic apparatus further includes a first elastic member connected between the main body and the first sliding member. When the first sliding member moves relative to the main body along the first direction, the first elastic member stores elastic potential, and the first elastic member is configured to release the elastic potential to drive the first sliding member to return to its original position.

In one embodiment, the electronic apparatus further includes a second elastic member connected between the main body and the second sliding member. When the second sliding member moves relative to the main body along the second direction, the second elastic member stores elastic potential, and the second elastic member is configured to release the elastic potential to drive the second sliding member to return to its original position.

In one embodiment, the electronic apparatus further includes a third sliding member slidably disposed on the base along the first direction. When the base is located within the main body, the first sliding member is configured to move relative to the main body along the first direction to push the third sliding member, such that the third sliding member pushes the electronic device to move away from the base along the first direction.

In one embodiment, the electronic apparatus further includes a third elastic member connected between the base and the third sliding member. When the third sliding member moves relative to the base along the first direction, the third elastic member stores elastic potential, and the third elastic member is configured to release the elastic potential to drive the third sliding member to return to its original position.

In one embodiment, the second sliding member has a hook, and the base has a slot, and the hook is engaged in the slot to position the base when the base is located within main body.

In one embodiment, when the second sliding member moves relative to the main body along the second direction, the hook is configured to move away from the slot along with the movement of the second sliding member.

In one embodiment, the base includes an inclined plane, and the second sliding member is configured to move along the second direction to push the inclined plane by means of the hook, so as to drive the base to move along the first direction.

In one embodiment, the base includes an electrical connecting portion, and the electronic device is electrically connected with the main body through the base.

In one embodiment, the base is a charging dock, and the main body supplies power to the electronic device through the base.

In view of the forgoing, in the electronic apparatus of the present invention, the electronic device can be disposed on the base within the main body so as to perform data transmission with the main body or to be charged. As such, it facilitates the user moving the main body and the electronic device at the same time, and can prevent the electronic device from being damaged due to falling down to the ground. In addition, the user may push the control button along the first direction to remove the electronic device from the base and the main body, or along the second direction to remove the base and the electronic device from the main body. Therefore, one single control button can be used to remove the electronic device and the base in various manners, thereby increasing the convenience in using the electronic apparatus.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1:
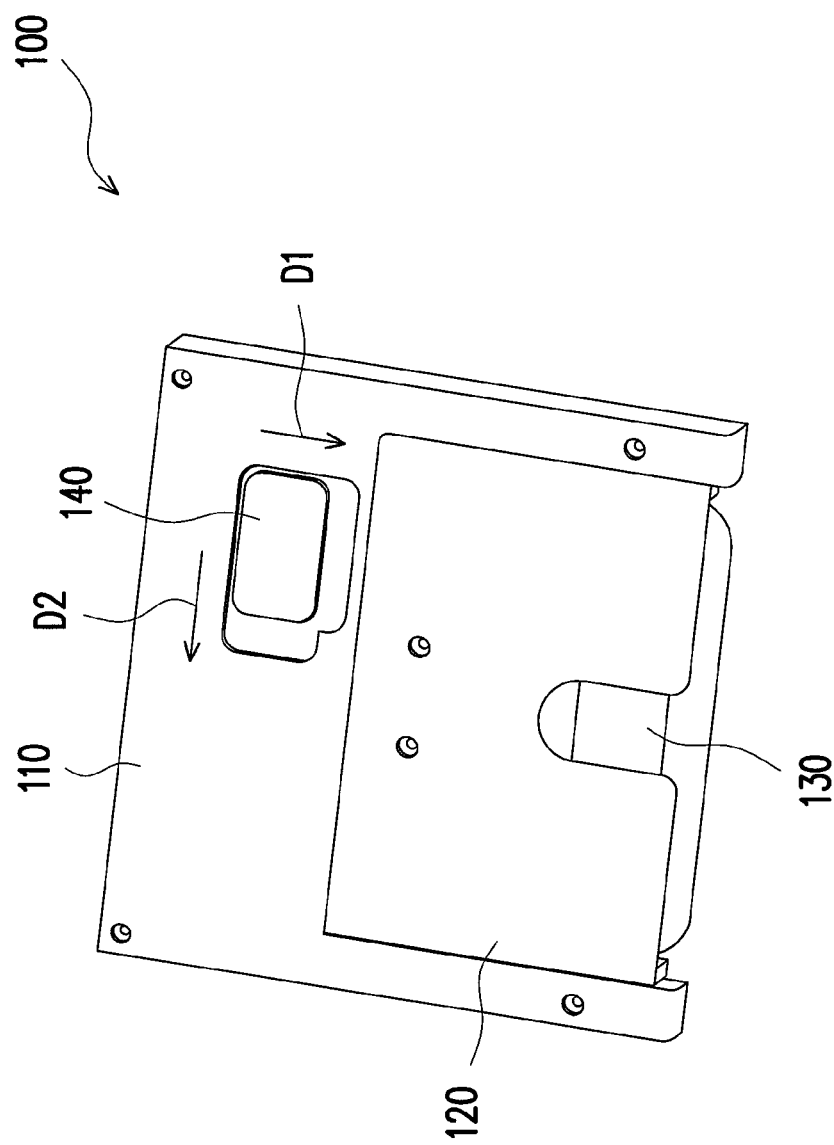
FIG. 1 is a perspective view of an electronic apparatus according to one embodiment of the present invention.
Figure 2:
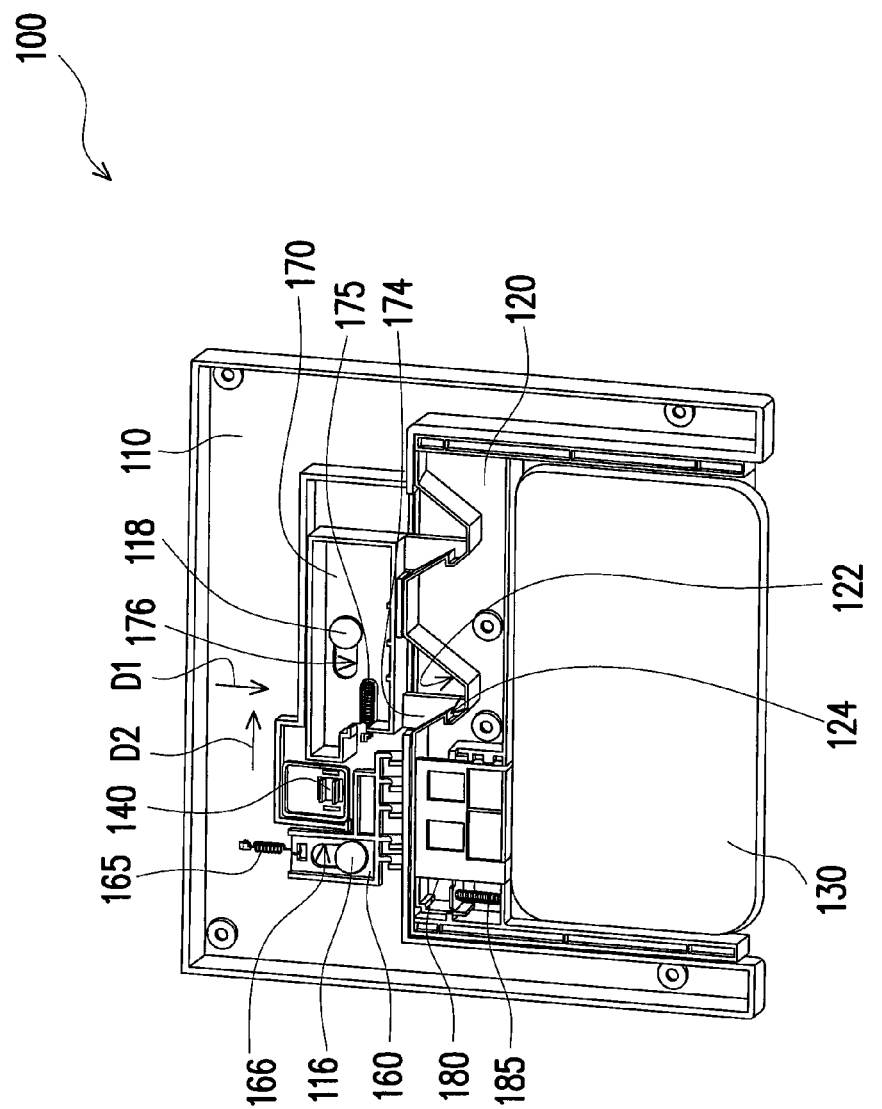
FIG. 2 is a perspective view of the electronic apparatus of FIG. 1 viewed from another angle.

FIG. 1 is a perspective view of an electronic apparatus according to one embodiment of the present invention. FIG. 2 is a perspective view of the electronic apparatus of FIG. 1 viewed from another angle. Referring to FIG. 1 and FIG. 2, the electronic apparatus 100 of the present embodiment includes a main body 110, a base 120, an electronic device 130, and a control button 140. The base 120 is detachably disposed within the main body 110. The electronic device 130 is detachably disposed on the base 120. The control button 140 is movably disposed on the main body 110.

Figure 3:
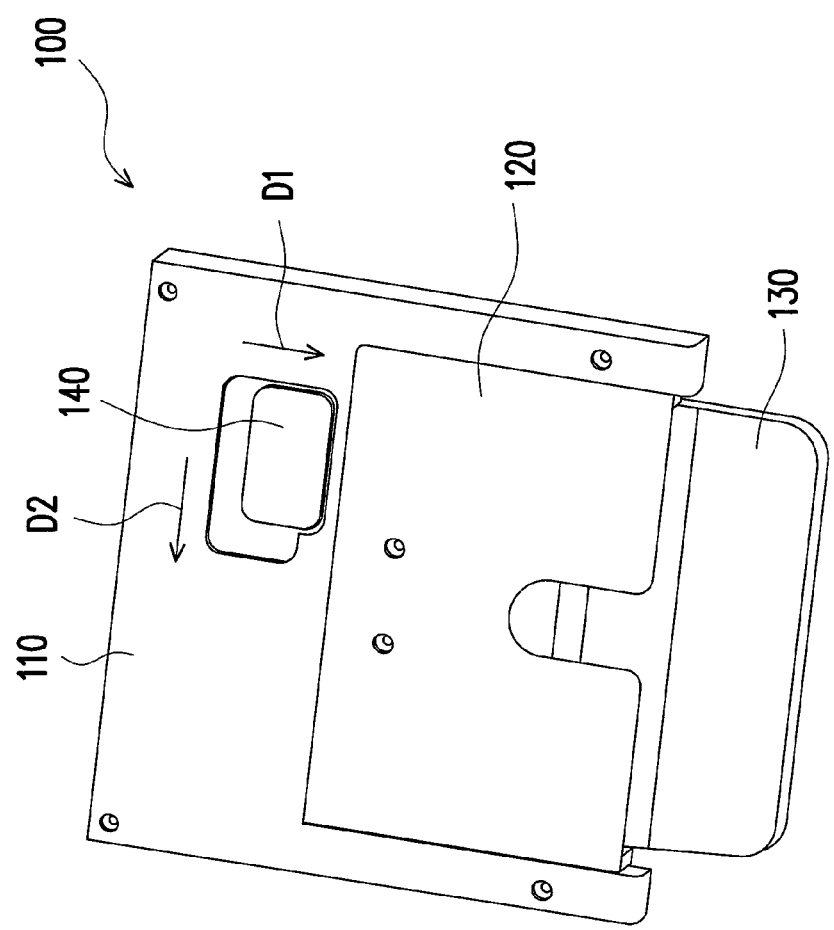
FIG. 3 is a perspective view of the electronic device moving away from the base and the main body of FIG. 1.
Figure 4:
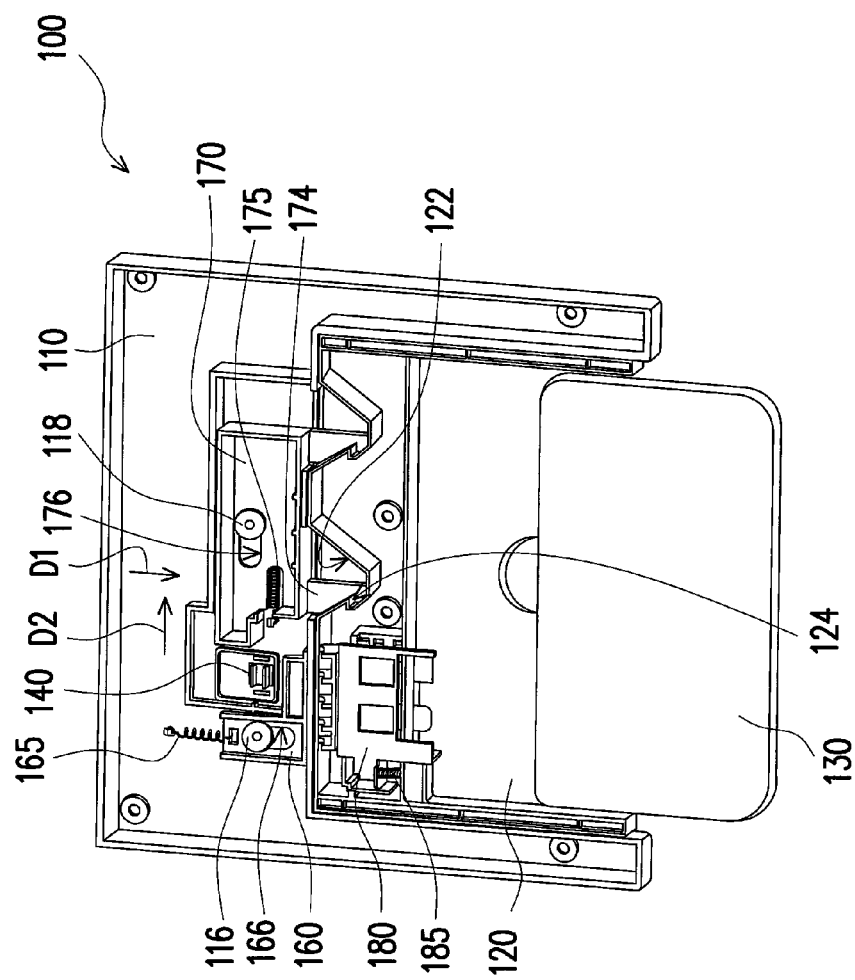
FIG. 4 is a perspective view of the electronic apparatus of FIG. 3 viewed from another angle.
Figure 5:
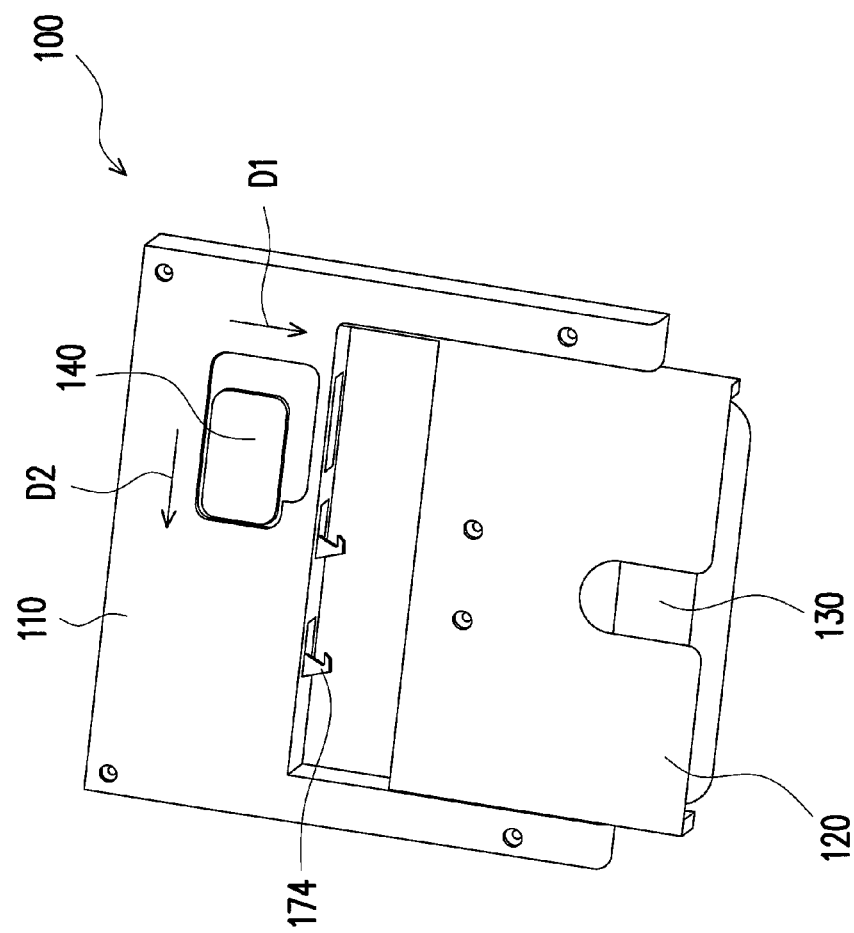
FIG. 5 is a perspective view of the base and electronic device moving away from the main body of FIG. 1.
Figure 6:
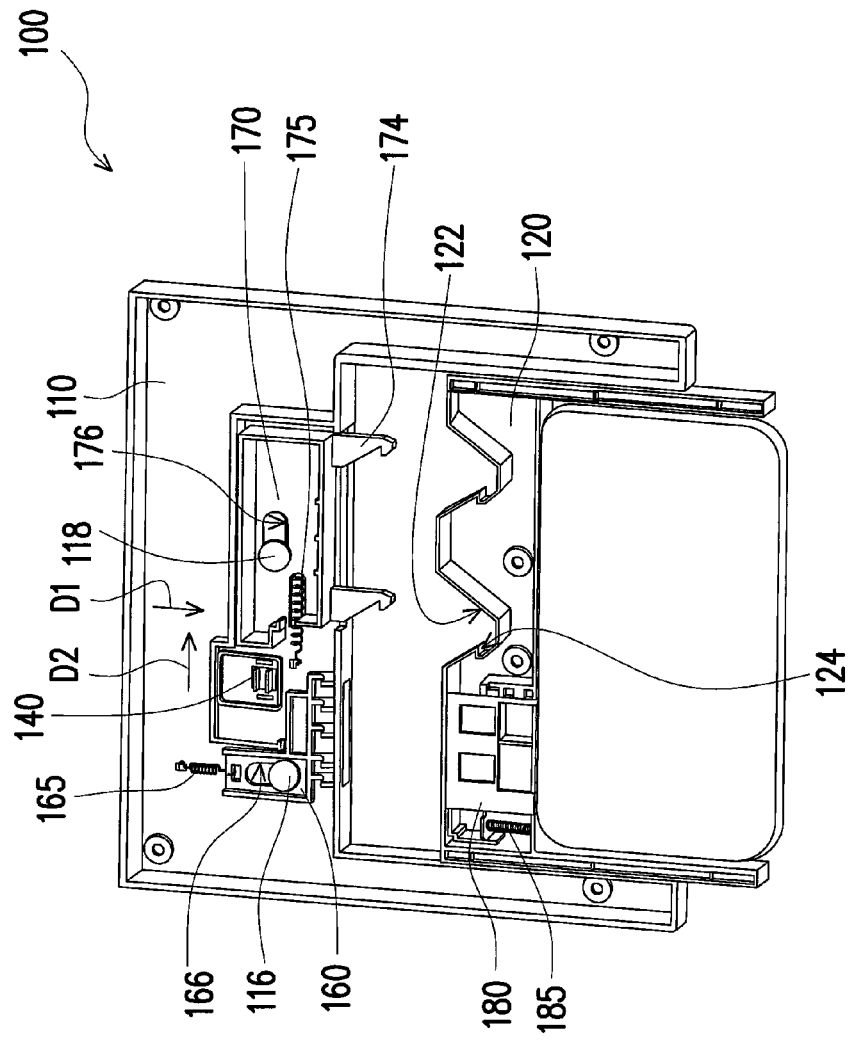
FIG. 6 is a perspective view of the electronic apparatus of FIG. 5 viewed from another angle.

FIG. 3 is a perspective view of the electronic device moving away from the base and the main body of FIG. 1. FIG. 4 is a perspective view of the electronic apparatus of FIG. 3 viewed from another angle. When the control button 140 is moved from a position illustrated in FIG. 1 and FIG. 2 to a position illustrated in FIG. 3 and FIG. 4 with respect to the main body 110 along a first direction, the control button 140 drives the electronic device 130 to move away from the base 120 and the main body 110. FIG. 5 is a perspective view of the base and electronic device moving away from the main body of FIG. 1. FIG. 6 is a perspective view of the electronic apparatus of FIG. 5 viewed from another angle. When the control button 140 is moved from the position illustrated in FIG. 1 and FIG. 2 to a position illustrated in FIG. 5 and FIG. 6 with respect to the main body 110 along a second direction, the control button 140 drives the base 120 and the electronic device 130 to move away from the main body 110.

In the present embodiment, the electronic device 130 is, for example, a separable touch panel module or a mobile phone. The base 120 is, for example, a charging dock. The main body 110 is, for example, a notebook computer. For clearer illustration, only a portion of a housing of the notebook computer is shown to represent the main body 110. In addition, the base 120 may further include an electrical connecting portion (not shown), and the electronic device 130 may be disposed on the base 120 within the main body 110, such that the electronic device 130 may be electrically connected with the main body 110 through the base 120. As such, the electronic device 130 may perform data transmission with the main body 110 which may be, for example, the notebook computer, or may be charged. Therefore, it facilitates the user moving the main body 110 and the electronic device 130 at the same time, and can prevent the electronic device 130 from falling down to the ground to damage the electronic device 130. In addition, the user may push the control button 140 along the first direction to remove the electronic device 130 from the base 120 and the main body 110, or along the second direction to remove the base 120 and the electronic device 130 from the main body 110. Therefore, one single control button 140 can be used to remove the electronic device 130 and the base 120 in various manners, thereby increasing the convenience in using the electronic apparatus 100.

Detailed structure and operation of the electronic apparatus 100 are discussed below. Referring to FIG. 2, in the present embodiment, the electronic apparatus 100 further includes a first sliding member 160, a second sliding member 170, a third sliding member 180, a first elastic member 165, a second elastic member 175, and a third elastic member 185. The first sliding member 160 is slidably disposed on the main body 110 along the first direction D1. The second sliding member 170 is slidably disposed on the main body 110 along the second direction D2. The third sliding member 180 is slidably disposed on the base 120 along the first direction D1. In the present embodiment, the first direction D1 and the second direction D2 are, for example, perpendicular to each other. The first elastic member 165 is connected between the first sliding member 160 and the main body 110. The second elastic member 175 is connected between the second sliding member 170 and the main body 110. The third elastic member 185 is connected between the third sliding member 180 and the base 120.

When the user pushes the control button 140 from the position illustrated in FIG. 1 and FIG. 2 to the position illustrated in FIG. 3 and FIG. 4 with respect to the main body 110 along the first direction D1, the control button 140 pushes the first sliding member 160 along the first direction D1 to drive the first sliding member 160 to push the third sliding member 180 on the base 120 along the first direction D1, such that the electronic device 130 is driven by the third sliding member 180 to move away from the base 120 along the first direction D1. When the first sliding member 160 and the third sliding member 180 operate from the state illustrated in FIG. 2 to the state illustrated in FIG. 4, the first elastic member 165 is stretched to store elastic potential along with the movement of the first sliding member relative to the main body 110, and the third elastic member 185 is compressed to store elastic potential along with the movement of the third sliding member relative to the base 120. When the user no longer exerts the force on the control button 140, the elastic potential of the first elastic member 165 is released which drives the first sliding member 160 to return to the position illustrated in FIG. 2, and the elastic potential of the third elastic member 185 is released which drives the third sliding member 180 to return to the position illustrated in FIG. 2.

When the user pushes the control button 140 from the position illustrated in FIG. 1 and FIG. 2 to the position illustrated in FIG. 5 and FIG. 6 with respect to the main body 110 along the second direction D2, the control button 140 pushes the second sliding member 170 along the second direction D2, such that the base 120 is driven by the second sliding member 170 to move away from the main body 110 along the second direction D2. When the second sliding member 170 operates from the state illustrated in FIG. 2 to the state illustrated in FIG. 6, the second elastic member 175 is stretched to store elastic potential along with the movement of the second sliding member 170 relative to the main body 110. When the user no longer exerts the force on the control button 140, the elastic potential of the second elastic member 175 is released which drives the second sliding member 170 to return to the position illustrated in FIG. 2.

Specifically, the second sliding member 170 of the present embodiment has at least one hook 174 (two hooks are illustrated in the drawings), and the base 120 includes at least one inclined plane 122 (two inclined planes are illustrated) and at least one slot 124 (two slots are illustrated in the drawings). When the base 120 is disposed in the main body 110 as shown in FIG. 2, the hook 174 is engaged in the slot 124 to position the base 120 to the main body 110. When the second sliding member 170 moves relative to the main body 110 along the second direction D2, the hook 174 moves away from the slot 124 along the second direction D2 along with the movement of the second sliding member 170, such that the base 120 is no longer limited by the hook 174. When the hook 174 moves away from the slot 124 along with the movement of the second sliding member 170, the hook 174 pushes the inclined plane 122 to drive the base 120 to move away from the main body 110 along the first direction D1 at the same time.

In the present embodiment, the first sliding member 160 includes a guide rail 166. A fastener 116 passes through the guide rail 166 and is fastened to the main body 110 to retain the first sliding member 160 to the main body 110. The fastener 116 and the guide rail 166 can move along the first direction D1 to provide freedom of operation of the first sliding member 160. Similarly, the second sliding member 170 includes a guide rail 176. A fastener 118 passes through the guide rail 176 and is fastened to the main body 110 to retain the second sliding member 170 to the main body 110. The fastener 118 and the guide rail 176 can move along the second direction D2 to provide freedom of operation of the second sliding member 170.

In summary, in the electronic apparatus of the present invention, the electronic device can be disposed on the base within the main body so as to perform data transmission with the main body or to be charged. As such, it facilitates the user moving the main body and the electronic device at the same time, and can prevent the electronic device from being damaged due to falling down to the ground. In addition, the user may push the control button along the first direction to remove the electronic device from the base and the main body, or along the second direction to remove the base and the electronic device from the main body. Therefore, one single control button can be used to remove the electronic device and the base in various manners, thereby increasing the convenience in using the electronic apparatus.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic apparatus comprising:
a main body;
a base detachably disposed within the main body;
an electronic device detachably disposed on the base; and
a control button movably disposed on the main body, wherein when the control button moves relative to the main body along a first direction, the control button drives the electronic device to move away from the base and the main body, and when the control button moves relative to the main body along a second direction, the control button drives the base such that the base and the electronic device move away from the main body.

2. The electronic apparatus according to claim 1, wherein the first direction is perpendicular to the second direction.

3. The electronic apparatus according to claim 1, further comprising:
a first sliding member slidably disposed on the main body along the first direction, wherein when the control button moves relative to the main body along the first direction to push the first sliding member, the first sliding member drives the electronic device to move away from the base along the first direction; and
a second sliding member slidably disposed on the main body along the second direction, wherein when the control button moves relative to the main body along the second direction to push the second sliding member, the second sliding member pushes the base to move away from the main body along the first direction.

4. The electronic apparatus according to claim 3, wherein the base comprises an inclined plane, and the second sliding member is configured to move along the second direction to push the inclined plane so as to drive the base to move along the first direction.

5. The electronic apparatus according to claim 3, further comprising a first elastic member connected between the main body and the first sliding member, wherein when the first sliding member moves relative to the main body along the first direction, the first elastic member stores elastic potential, and the first elastic member is configured to release the elastic potential to drive the first sliding member to return to its original position.

6. The electronic apparatus according to claim 3, further comprising a elastic member connected between the main body and the second sliding member, wherein when the sliding member moves relative to the main body along the second direction, the elastic member stores elastic potential, and the elastic member is configured to release the elastic potential to drive the second sliding member to return to its original position.

7. The electronic apparatus according to claim 3, further comprising a third sliding member slidably disposed on the base along the first direction, wherein when the base is located within the main body, the first sliding member is configured to move relative to the main body along the first direction to push the third sliding member, such that the third sliding member pushes the electronic device to move away from the base along the first direction.

8. The electronic apparatus according to claim 7, further comprising a elastic member connected between the base and the third sliding member, wherein when the third sliding member moves relative to the base along the first direction, the elastic member stores elastic potential, and the elastic member is configured to release the elastic potential to drive the third sliding member to return to its original position.

9. The electronic apparatus according to claim 3, wherein the second sliding member has a hook, the base has a slot, and the hook is engaged in the slot to position the base when the base is located within main body.

10. The electronic apparatus according to claim 9, wherein when the second sliding member moves relative to the main body along the second direction, the hook is configured to move away from the slot along with the movement of the second sliding member.

11. The electronic apparatus according to claim 9, wherein the base comprises an inclined plane, and the second sliding member is configured to move along the second direction to push the inclined plane by means of the hook, so as to drive the base to move along the first direction.

12. The electronic apparatus according to claim 1, wherein the base comprises an electrical connecting portion, and the electronic device is electrically connected with the main body through the base.

13. The electronic apparatus according to claim 1, wherein the base is a charging dock, and the main body supplies power to the electronic device through the base.

* * * * *